(12) United States Patent
Aminikashani et al.

(10) Patent No.: US 10,862,558 B1
(45) Date of Patent: Dec. 8, 2020

(54) VEHICLE TELEMATICS SYSTEMS WITH MIMO ANTENNA SELECTION BASED ON CHANNEL STATE INFORMATION

(71) Applicant: GM GLOBAL TECHNOLOGY OPERATIONS LLC, Detroit, MI (US)

(72) Inventors: Mohammadreza Aminikashani, West Bloomfield, MI (US); Jang Hwan Oh, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/664,024

(22) Filed: Oct. 25, 2019

(51) Int. Cl.
| | |
|---|---|
| H04B 7/0456 | (2017.01) |
| H04B 7/024 | (2017.01) |
| H04B 7/06 | (2006.01) |
| H01Q 1/32 | (2006.01) |
| G07C 5/00 | (2006.01) |
| H04W 4/40 | (2018.01) |
| H04W 84/00 | (2009.01) |
| H04B 17/327 | (2015.01) |

(52) U.S. Cl.
CPC ........... *H04B 7/0486* (2013.01); *G07C 5/008* (2013.01); *H01Q 1/3216* (2013.01); *H04B 7/024* (2013.01); *H04B 7/0689* (2013.01); *H04B 17/327* (2015.01); *H04W 4/40* (2018.02); *H04W 84/005* (2013.01)

(58) Field of Classification Search
None
See application file for complete search history.

(56) References Cited

U.S. PATENT DOCUMENTS

| | | | | |
|---|---|---|---|---|
| 6,952,181 | B2 * | 10/2005 | Karr | G01C 21/206 342/457 |
| 6,973,323 | B2 * | 12/2005 | Oesterling | H04L 12/2854 455/456.4 |
| 7,903,029 | B2 * | 3/2011 | Dupray | H04W 64/00 342/457 |
| 8,082,096 | B2 * | 12/2011 | Dupray | G08G 1/096811 701/465 |
| 8,462,716 | B1 * | 6/2013 | Li | H04B 7/065 370/329 |
| 9,134,398 | B2 * | 9/2015 | Dupray | G01S 1/026 |
| 9,538,493 | B2 * | 1/2017 | Dupray | G01S 5/0009 |

(Continued)

FOREIGN PATENT DOCUMENTS

CN 104822164 A * 8/2015 ............ H04W 36/08

*Primary Examiner* — Berhanu Tadese

(57) ABSTRACT

A communication system for a vehicle includes a transceiver and a telematics control module. The transceiver receives data from a network device using first antennas disposed external to a vehicle and second antennas disposed internal to the vehicle. The transceiver receives the data using a first antenna combination including two antennas, which include one or more of the first antennas or one or more of the second antennas. The telematics control module: reads channel state information including reference signal received power (RSRP) and rank indicator (RI) values; determines if the RSRP value is greater than a threshold value and the RI value is less than a minimum number of antennas being used to transfer the data; and based on the first RSRP value being greater than the threshold value and the RI value being less than the number of antennas, switches from the first to a second antenna combination.

20 Claims, 6 Drawing Sheets

(56) References Cited

U.S. PATENT DOCUMENTS

| | | | |
|---|---|---|---|
| 9,867,022 B1* | 1/2018 | Schaefer, Jr. | H04W 4/90 |
| 9,894,492 B1* | 2/2018 | Elangovan | H01Q 1/3241 |
| 10,212,690 B1* | 2/2019 | Lau | H04W 52/00 |
| 10,601,461 B1* | 3/2020 | Eaton | H01Q 1/3208 |
| 10,630,410 B2* | 4/2020 | Parkvall | H04J 11/0079 |
| 10,637,544 B1* | 4/2020 | Shattil | H04W 72/046 |
| 10,641,861 B2* | 5/2020 | Dupray | G01S 5/0257 |
| 2004/0203850 A1* | 10/2004 | Oesterling | G01C 21/28 455/456.1 |
| 2004/0203864 A1* | 10/2004 | DiBuduo | H04W 48/20 455/456.1 |
| 2005/0136981 A1* | 6/2005 | Rensburg | H04W 16/28 455/562.1 |
| 2006/0082471 A1* | 4/2006 | Rockett | B60R 25/00 340/988 |
| 2006/0135075 A1* | 6/2006 | Tee | H04L 5/006 455/67.13 |
| 2007/0061069 A1* | 3/2007 | Christensen | H04L 61/157 701/1 |
| 2007/0064667 A1* | 3/2007 | Rensburg | H04W 72/085 370/346 |
| 2011/0002411 A1* | 1/2011 | Forenza | H04B 7/024 375/267 |
| 2011/0003606 A1* | 1/2011 | Forenza | H04B 7/0417 455/501 |
| 2011/0116488 A1* | 5/2011 | Grandhi | H04B 7/0417 370/338 |
| 2012/0044089 A1* | 2/2012 | Yarnold | H04B 7/26 340/901 |
| 2012/0252475 A1* | 10/2012 | Farrell | H04W 4/80 455/450 |
| 2012/0258725 A1* | 10/2012 | Yi | H04W 4/90 455/456.1 |
| 2012/0327918 A1* | 12/2012 | Yi | H04W 4/029 370/337 |
| 2014/0213176 A1* | 7/2014 | Mendelson | H04W 4/024 455/39 |
| 2014/0241296 A1* | 8/2014 | Shattil | H04B 7/0697 370/329 |
| 2016/0143022 A1* | 5/2016 | Kim | H04W 12/0608 455/415 |
| 2016/0258772 A1* | 9/2016 | Chang | H04W 4/026 |
| 2016/0270025 A1* | 9/2016 | Osann, Jr. | H04W 4/027 |
| 2016/0278087 A1* | 9/2016 | Thanayankizil | H04W 4/06 |
| 2016/0316358 A1* | 10/2016 | Orr | H04W 8/22 |
| 2017/0302774 A1* | 10/2017 | Lei | H04W 64/003 |
| 2018/0035382 A1* | 2/2018 | Fonseca Montero | H04W 52/0254 |
| 2018/0035434 A1* | 2/2018 | Thanayankizil | H04W 76/10 |
| 2018/0077712 A1* | 3/2018 | Carnevale | H04L 67/04 |
| 2018/0220410 A1* | 8/2018 | Baghel | H04W 72/048 |
| 2018/0376301 A1* | 12/2018 | Park | H04W 76/25 |
| 2019/0059071 A1* | 2/2019 | Khoryaev | H04W 64/006 |
| 2019/0082378 A1* | 3/2019 | Dziurda | H04W 48/04 |
| 2019/0208436 A1* | 7/2019 | Zhou | H04L 69/22 |
| 2019/0222280 A1* | 7/2019 | Shu | H04W 72/10 |
| 2019/0253214 A1* | 8/2019 | Liu | H04L 5/0051 |
| 2019/0261315 A1* | 8/2019 | Zhang | H04J 11/0069 |
| 2019/0306909 A1* | 10/2019 | Zhou | H04B 7/08 |
| 2019/0335472 A1* | 10/2019 | Wu | H04B 7/0802 |
| 2019/0364492 A1* | 11/2019 | Azizi | H04W 4/029 |
| 2020/0018818 A1* | 1/2020 | Jager | G01S 3/465 |
| 2020/0112973 A1* | 4/2020 | Cross | G08G 1/09675 |

\* cited by examiner

VEHICLE TELEMATICS SYSTEMS WITH MIMO ANTENNA SELECTION BASED ON CHANNEL STATE INFORMATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to in-vehicle wireless communication systems and services.

Vehicles provide various in-vehicle infotainment and wireless communication services for occupants. This can include providing in-vehicle hotspots for mobile communication, Internet access, video downloading, cloud-based network access, etc. This wireless communication may include communication over, for example, cellular and/or local area networks (LAN). The vehicles may provide this communication via telematics control modules.

A telematics control module may be connected to one or more antennas located on an exterior of a vehicle. As an example, a vehicle may include a "shark fin" style antenna housing that includes two externally mounted antennas. The telematics control module may operate according to multiple input multiple output (MIMO) protocols and exchange signals with, for example, a cellular or mobile network or an access point to connect with and determine the appropriate operating mode. The cellular network may transmit a signal to the telematics control module. Based on the received signal, the telematics control module may then determine channel state (or quality) information and transmit a feedback signal including the channel state information to the cellular network. The channel state information may include, for example, a channel quality indicator (CQI), a pre-coding matrix indicator (PMI) or a rank indicator (RI). The cellular network may then determine whether to operate in a "transmit diversity" or a "spatial multiplexing" mode based on the channel state information. While in the transmit diversity mode and as an example for a 2×2 MIMO configuration, two versions of a same signal may be transmitted in parallel from the cellular network to the two externally mounted antennas of the vehicle. While in the spatial multiplexing mode and as another 2×2 MIMO configuration example, two different signals may be transmitted in parallel from the cellular network respectively to the two externally mounted antennas of the vehicle. The transmit diversity mode may be enabled to improve and/or maintain a minimum received SNR for a transmitted signal. If the received SNR is high enough and the rank and condition number of the MIMO channel matrix are suitable, the spatial multiplexing mode may be selected to increase the peak data rate.

SUMMARY

A MIMO communication system for a vehicle is provided. The MIMO communication system includes a transceiver and a telematics control module. The transceiver is configured to receive data from a network device remotely located from the vehicle using (i) first antennas disposed external to a vehicle, and (ii) second antennas disposed internal to the vehicle. The transceiver receives the data using a first antenna combination including at least two antennas. The at least two antennas includes at least one of (i) one or more of the first antennas or (ii) one or more of the second antennas. The telematics control module is configured to: read channel state information including a first reference signal received power value and a first rank indicator value; determine if the first reference signal received power value is greater than a threshold value and the first rank indicator value is less than a number of antennas in the at least two antennas being used to receive the data, where the number of antennas is a minimum number of antennas used at any moment by the telematics control module and the network device remotely located from the vehicle; and based on the first reference signal received power value being greater than the threshold value and the first rank indicator value being less than the number of antennas, switch from the first antenna combination to a second antenna combination. The second antenna combination includes at least one of the second antennas and is different than the first antenna combination.

In other features, the first antenna combination includes two or more of the first antennas and does not include any internal antennas.

In other features, while using the first antenna combination, at least one of the second antennas is not in use.

In other features, while using the second antenna combination, at least one of the first antennas is not in use.

In other features, at any moment in time, at least one of (i) one or more of the first antennas, or (ii) one or more of the second antennas is not in use.

In other features, the second antenna combination includes at least one of the first antennas.

In other features, the transceiver is configured to transmit using the at least one of the first antennas while using the second antenna combination.

In other features, the telematics control module is configured to select an antenna combination having a best rank indicator value. The selected antenna combination having the best rank indicator value is the second antenna combination.

In other features, the number of possible antenna combination to select from is greater than two.

In other features, the telematics control module is configured to: subsequent to switching to the second antennas combination, read a second rank indicator value; determine if the second rank indicator value is greater than at least one of the first rank indicator value or a rank indicator default value; based on the second rank indicator value being greater than the at least one of the first rank indicator value or the rank indicator default value, maintain use of the second antenna combination; and based on the second rank indicator value not being greater than the at least one of the first rank indicator value or the rank indicator default value, return to using the first antenna combination.

In other features, the telematics control module is configured to: based on the second rank indicator value not being greater than the at least one of the first rank indicator value or the rank indicator default value, increase the threshold value; read a second reference signal received power value and a third rank indicator value; determine if the second reference signal received power value is greater than the increased threshold value and the third rank indicator value is less than the number of antennas; and based on the second reference signal received power value being greater than the increased threshold value and the third rank indicator value being less than the number of antennas, switch to the second antenna combination or a third antenna combination. The third antenna combination includes at least one of the second antennas.

In other features, the telematics control module is configured to set the threshold value equal to a default value when the vehicle is in a high coverage area and signal quality is greater than a predetermined level.

In other features, the telematics control module is configured to: starting a threshold reset timer prior to switching to the second antenna combination; switching from the second antenna combination back to the first antenna combination; increasing the threshold value as a result of switching back to the first antenna combination; determining if threshold reset timer has expired; and based on the threshold reset timer expiring, resetting the threshold value to the default value.

In other features, the MIMO communication system further includes the first antennas and the second antennas.

In other features, an antenna selection method for a telematics control module of a MIMO communication system is provided. The antenna selection method includes: receiving first data from a network device remotely located from a vehicle using a first combination of antennas, where the first combination of antennas includes at least two antennas, where the at least two antennas includes at least one of (i) one or more first antennas or (ii) one or more second antennas, where the first antennas are disposed external to the vehicle, and where the second antennas are disposed internal to the vehicle; via the telematics control module, reading channel state information including a first reference signal received power value and a first rank indicator value; determining if the first reference signal received power value is greater than a threshold value and the first rank indicator value is less than a number of antennas in the at least two antennas being used to receive the data, where the number of antennas is a minimum number of antennas used at any moment by the telematics control module and the network device remotely located from the vehicle; and based on the first reference signal received power value being greater than the threshold value and the first rank indicator value is less than the number of antennas, switching from the first antenna combination to a second antenna combination. The second antenna combination includes at least one of the second antennas and is different than the first antenna combination.

In other features, the method further includes setting the threshold value equal to a default value when the vehicle is in a high coverage area and signal quality is greater than a predetermined level.

In other features, while using the first antenna combination, at least one of the second antennas is not in use. While using the second antenna combination, at least one of the first antennas is not in use. At any moment in time, at least one of (i) one or more of the first antennas, or (ii) one or more of the second antennas is not in use.

In other features, the method further includes selecting an antenna combination having a best rank indicator value. The selected antenna combination having the best rank indicator value is the second antenna combination. The number of possible antenna combination to select from is greater than two.

In other features, the method further includes: subsequent to switching to the second antennas combination, reading a second rank indicator value; determining if the second rank indicator value is greater than at least one of the first rank indicator value or a rank indicator default value; based on the second rank indicator value being greater than the at least one of the first rank indicator value or the rank indicator default value, maintaining use of the second antenna combination; and based on the second rank indicator value not being greater than the at least one of the first rank indicator value or the rank indicator default value, returning to using the first antenna combination.

In other features, the method further includes: based on the second rank indicator value not being greater than the at least one of the first rank indicator value or the rank indicator default value, increasing the threshold value; reading a second reference signal received power value and a third rank indicator value; determining if the second reference signal received power value is greater than the increased threshold value and the third rank indicator value is less than the number of antennas; and based on the second reference signal received power value being greater than the increased threshold value and the third rank indicator value being less than the number of antennas, switching to the second antenna combination or a third antenna combination, wherein the third antenna combination includes at least one of the second antennas.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
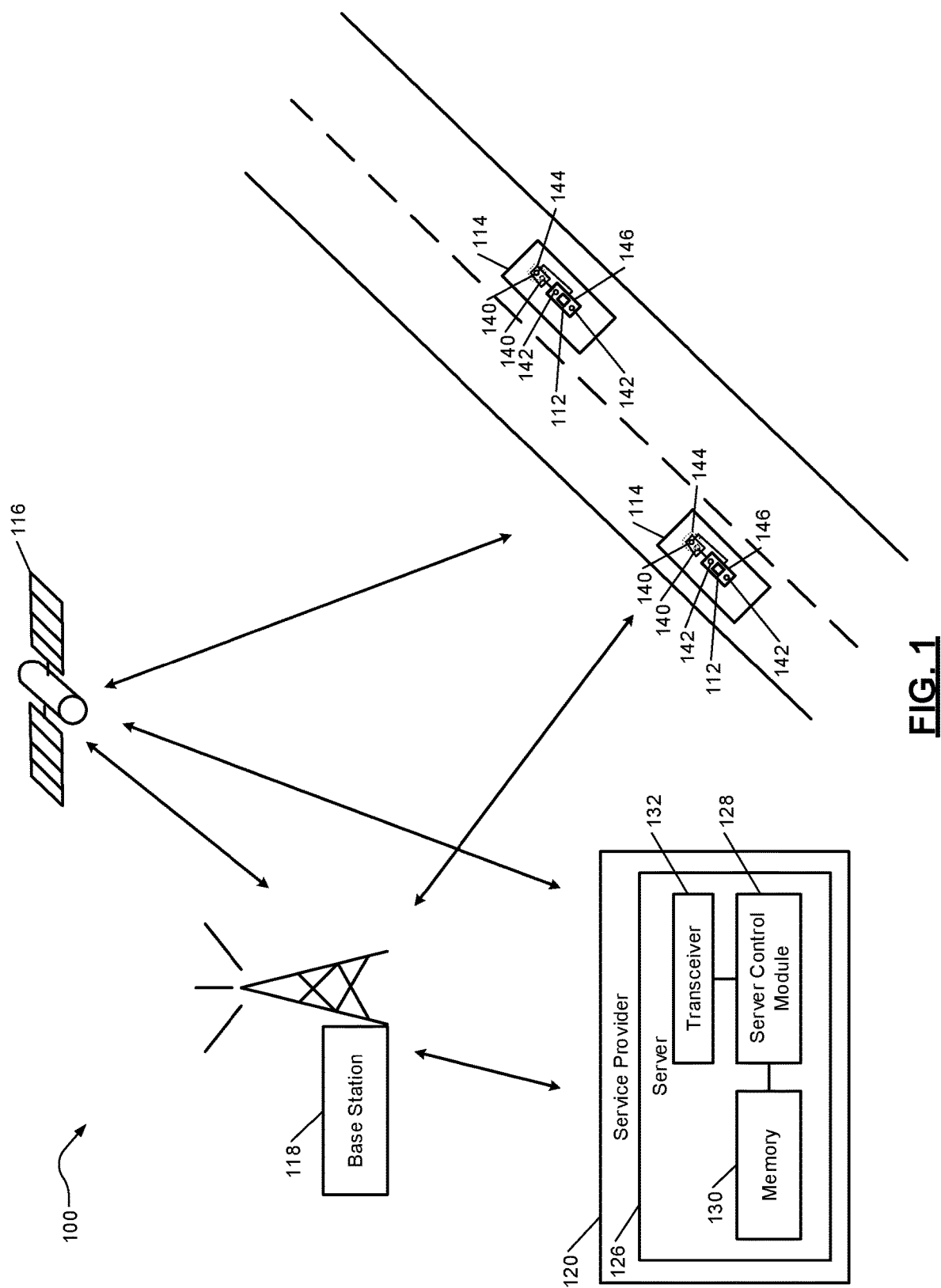
FIG. 1 is a functional block diagram of an example of a MIMO communication system including a wireless vehicle network incorporating vehicle telematics control modules with antenna selection modules in accordance with an embodiment of the present disclosure.

A vehicle may include a first MIMO radio frequency (RF) communication system. The first MIMO RF communication system may include, for example, a single pair of antennas mounted externally on the vehicle. The first MIMO RF communication system may operate in a transmit diversity or a spatial multiplexing mode depending on channel state information. While in a transmit diversity mode, two versions of a same signal may be transmitted in parallel from a cellular network and received by the two externally mounted antennas. While in a spatial multiplexing mode, two different signals may be transmitted in parallel from the cellular network and received by the two externally mounted antennas.

As another example, a vehicle may include a second MIMO RF communication system having: a first pair of antennas externally mounted on, for example, a roof of the vehicle; and a second pair of antennas disposed in the vehicle. The first pair of antennas may be used as primary antennas during normal vehicle operations and may operate in the transmit diversity or spatial multiplexing modes as described above. The second pair of antennas may be used as secondary (or backup) antennas when there is a failure with the first pair of antennas. This may occur, for example, in an accident or emergency situation.

The two above-described MIMO RF communication systems do not fully utilize network capacity to receive data. These types of MIMO RF communication systems are based on maximizing SNR and/or antenna gain and do not take signal scattering impact into account. Also, in addition to SNR, MIMO performance is highly dependent on the propagation environment and channel model structures. A high SNR associated with a line-of-sight (LOS) propagation often implies a low degree of scattering, which can cause capacity loss.

The examples set forth herein include MIMO RF communication systems with telematics control modules, externally mounted antennas and internally mounted antennas. The telematics control modules are able to, based on rank indicator (RI) values and reference signal received power (RSRP) values, determine the richness of a channel and select an antenna operating mode, which may include selecting a best antenna combination for a maximum (or increased) overall performance level including improved data throughput. The antenna combination providing the best throughput may be selected.

The telematics control modules are able to operate in an external antenna mode, a hybrid antenna mode, and an internal antenna mode. During the external antenna mode, only externally mounted antennas are utilized. During the hybrid antenna mode, one or more external antennas and one or more internal antennas are utilized. During the internal antenna mode, only internal antennas are utilized. The telematics control modules operate in the hybrid antenna mode and the internal antenna modes when, for example, (i) RSRP values are greater than predetermined RSRP thresholds and (ii) RI values are less than a number of antennas used by a telematics control module to communicate with a network device external to the corresponding vehicle. Internally mounted antennas can experience a richer scattering environment. For this reason, the internally mounted antennas are used in certain conditions to improve data throughput.

The telematics control modules do not utilize all externally and internally mounted antennas at any moment in time. The telematics control modules use a portion of the externally and internally mounted antennas. This is done to minimize processing and chip complexity and corresponding system costs. As an example, if a MIMO RF communication system includes two externally mounted antennas and two internally mounted antennas, then two antennas may be used at any moment in time. The MIMO RF communication systems disclosed herein may include any number of externally mounted antennas and internally mounted antennas. The telematics control modules may select a best antenna combination at any moment in time, as further described below.

FIG. 1 shows a MIMO communication system 100 including a wireless vehicle network including telematics control modules 112 that are located within vehicles 114. The telematics control modules 112 are capable of wirelessly communicating with other network devices external to the vehicles 114, such as with a satellite 116, a base station 118, and/or a service provider 120. The telematics control modules 112 may perform as access points and/or as hotspots to provide network services to other network devices located internal to the vehicles 114, such as to a mobile phone, a laptop computer, a tablet, a wearable device, etc.

The service provider 120, which may provide services via, for example, the satellite 116 and/or the base station 118. The services may include network services, Internet services, streaming services, video services, cellular services, etc. As an example, the base station 118 may provide Internet services to the telematics control modules 112. The service provider 120 may include a server 126, which has a server control module 128, a memory 130 and a transceiver 132. The server 126 may communicate with the telematics control modules 112 via the satellite 116 and/or the base station 118 and provide the services via the transceiver 132.

The telematics control modules 112 may communicate with the service provider 120 via externally mounted antennas 140 and internally mounted antennas 142. The externally mounted antennas 140 may be disposed in a single housing 144, such as "shark fin" housings, and be disposed on roofs of the vehicles 114. The internally mounted antennas 142 may be disposed on housings 146 of the telematics control modules 112 or may be disposed elsewhere in the vehicles 112. Although two externally mounted antennas and two internally mounted antennas are shown for each vehicle, any number of each may be included per vehicle. In an embodiment, one of the externally mounted antennas operates in a combined transmit and receive mode and the other one of the externally mounted antennas operates in a receive only mode. Selection and use of the antennas 140, 142 are further described below.

Figure 2:
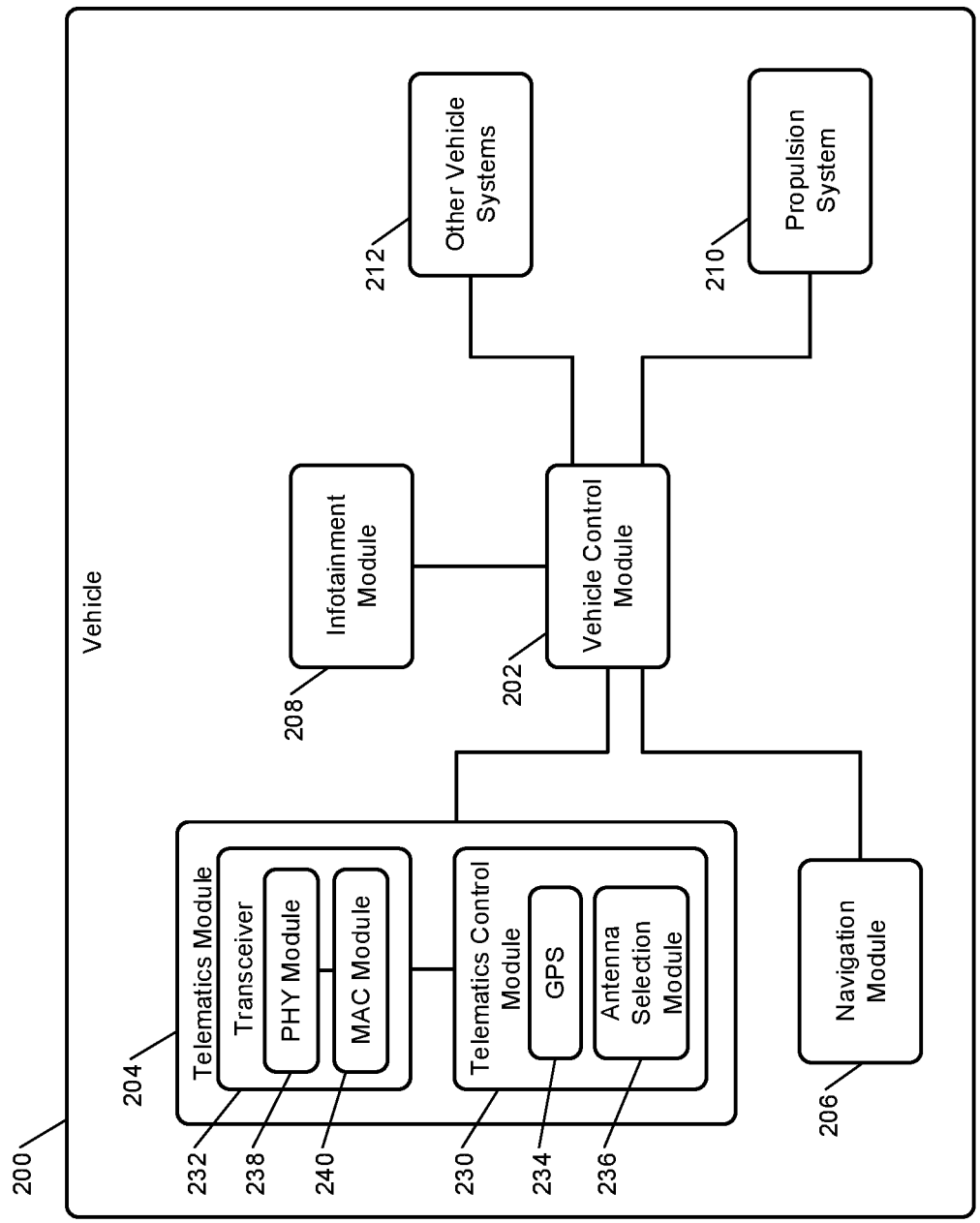
FIG. 2 is a functional block diagram of an example of a vehicle including a telematics control module with an antenna selection module in accordance with an embodiment of the present disclosure.

FIG. 2 shows a vehicle 200, which is an example of each of the vehicles 114 of FIG. 1. The vehicle 200 includes a vehicle control module 202, a telematics control module 204, a navigation module 206, an infotainment module 208, a propulsion system 210 and other vehicle systems 212. The vehicle control module 202 may control operation of the vehicle 200. The telematics control module 204 provides wireless communication services within the vehicle 200 and wirelessly communicates with service providers. The telematics control module 204 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics control module 204 may include a telematics control module 230 and a transceiver 232. The telematics control module 230 may include a global positioning system 234 and an antenna selection module 236. The transceiver 232 includes a physical layer (PHY) module 238 and a medium access control (MAC) module 240. The PHY module 238 wirelessly communicates with network devices internal and external to the vehicle 200. The MAC module 240 may perform pattern recognition, channel addressing, channel access control, and filtering operations.

The navigation module 206 executes a navigation application to provide navigation services. The infotainment module 208 may include an audio system and/or a video system including one or more displays to provide vehicle status information, diagnostic information, entertainment features, etc. The propulsion system 210 may include an internal combustion engine and/or one or more electric motors to propel the vehicle 200.

Figure 3:
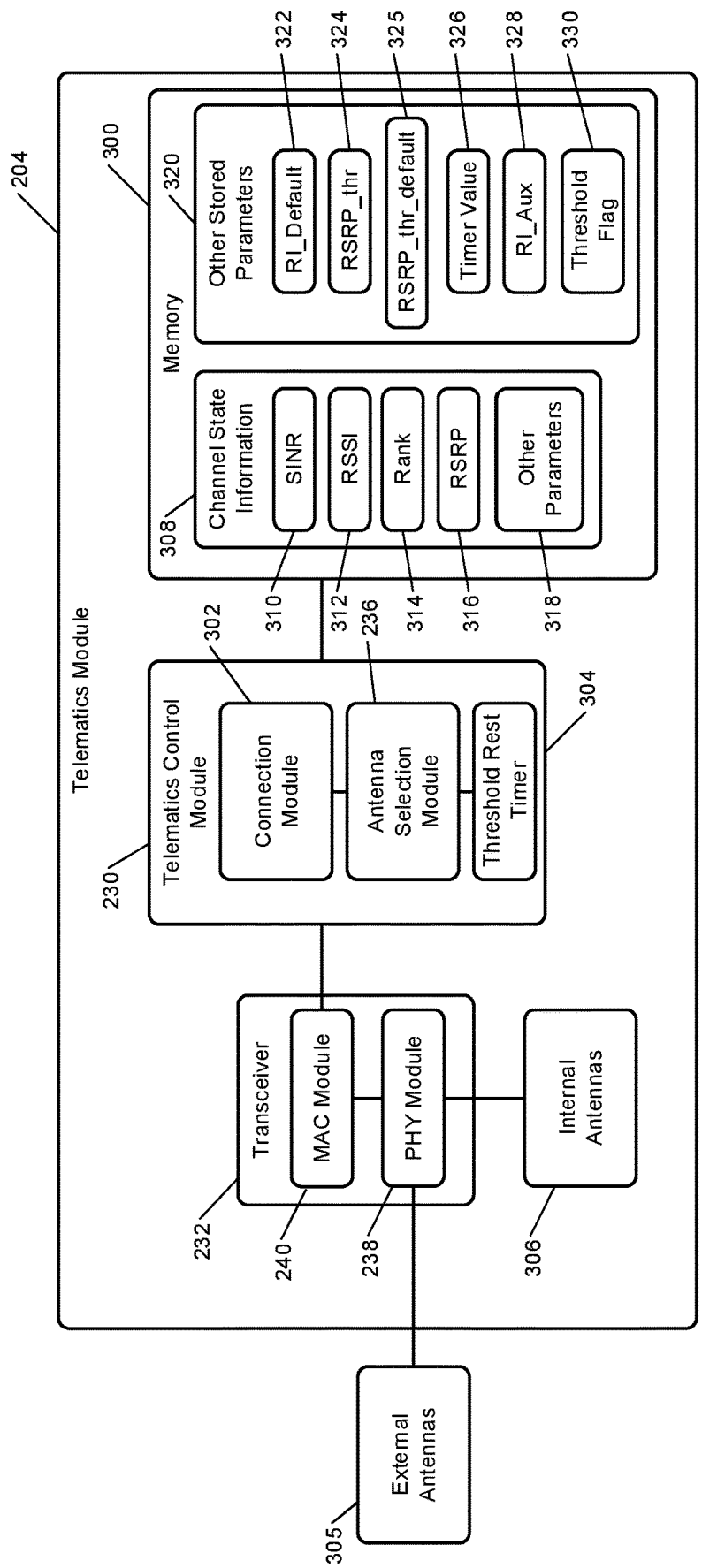
FIG. 3 is a functional block diagram of the telematics control module of FIG. 2.

FIG. 3 shows the telematics control module 204 that includes the telematics control module 230, the transceiver 232, and a memory 300. The telematics control module 230 may include a connection module 302, the antenna selection module 236 and a threshold reset timer 304. The connection module 302 establishes connections with network devices both internal and external to the vehicle. The transceiver 232 includes the PHY module 238 and the MAC module 240. The transceiver 232 communicates with the network devices external to the vehicle via external antennas 305 and internal antennas 306. In an embodiment, the external antennas 305 include two or more antennas. The external antennas 305 are located on the exterior of the vehicle, such as on a roof of the vehicle. As an example, two of the external antennas may be implemented in a shark fin antenna housing. In an embodiment, the internal antennas 306 include two or more antennas. The internal antennas 306 may be disposed on or in a housing of the telematics control module 204 and/or may be located at other locations within the vehicle. The antennas 305, 306 may each include wideband MIMO antennas.

As an example, the connection module 302 may detect a signal transmitted by a remotely located network device, such as a signal transmitted by the server control module 128 of FIG. 1 and perform a signal exchange (or "handshake") sequence to determine channel state (or quality) information 308 and establish an antenna operating mode. The connection module 302 and/or the server control module 128 may determine the channel state information 308. The channel state information 308 is shared between the connection module 302 and the server control module 128. The channel state information is stored in the memory 300 and may include signal to Interference and noise ratios (SINRs) 310, received signal strength indicator (RSSI) values 312, rank indicator (RI) values 314, reference signal received power (RSRP) values 316 and/or other parameters 318. The other parameters 318 may include, for example, frequencies, amplitudes, transmission rates, packet sequences, etc. The RSRP values 316 may be calculated based on the RSSI values 312. An RSRP value is a linear average over power contributions (in watts (W)) of resource elements that carry cell-specific reference signals within a considered measurement frequency bandwidth.

A rank indicator value is a number of useable data stream (layers) in a multi-antenna radio system. A rank indicator value may refer to a number of data streams transmitted over a same time-frequency resource (e.g., antenna), corresponding to the number of layers. A maximum RI may be equal to the minimum number of antennas used on each side of a transmission. Each side of a transmission may use a same number of antennas to transmit and/or receive signals. A maximum RI means no correlation (or interference) between transmit and receive antennas. As an example, in a 2×2 MIMO system, RI can be 1 or 2, where 2 is the maximum RI. In a 4×4 MIMO system, RI can be 1, 2, 3 or 4.

The server control module 128 may then, based on the channel state information, determine an antenna operating mode and indicate the antenna operating mode to the connection module 302. The antenna operating mode may be a transmit diversity, spatial multiplexing, or other antenna operating mode. While in the transmit diversity mode or other similar mode, multiple (two or more) versions of a same signal may be transmitted in parallel from the server control module 128 to the telematics control module 230. The signals may be received by two or more antennas including one or more of the external antennas 305 and/or one or more of the internal antennas 306. While in a spatial multiplexing mode, multiple (two or more) different signals may be transmitted in parallel from the server control module 128 and received by two or more antennas including one or more external antennas and one or more internal antennas.

Figure 5:
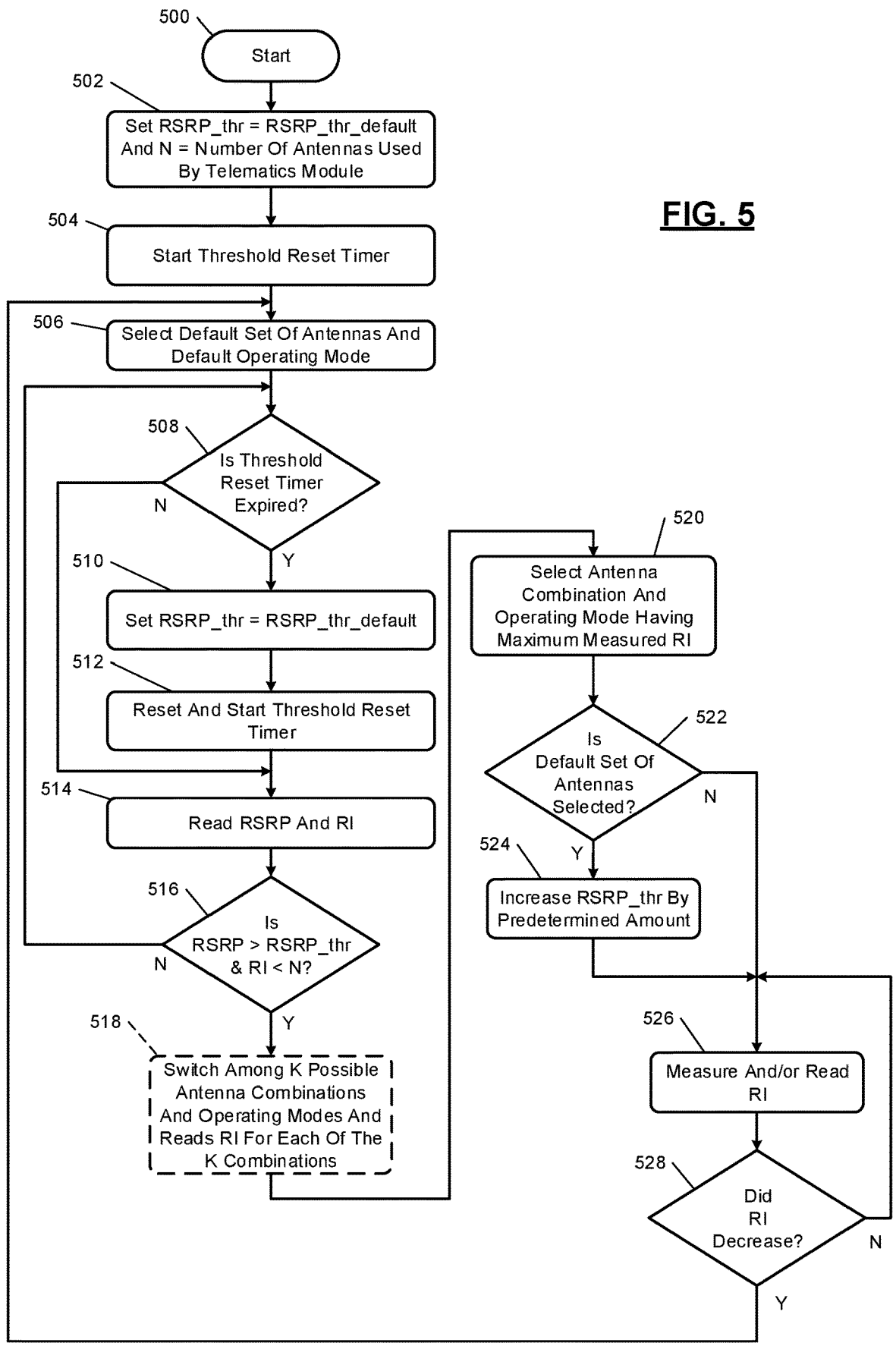
FIG. 5 illustrates an example antenna selection method in accordance with an embodiment of the present disclosure.
Figure 6:
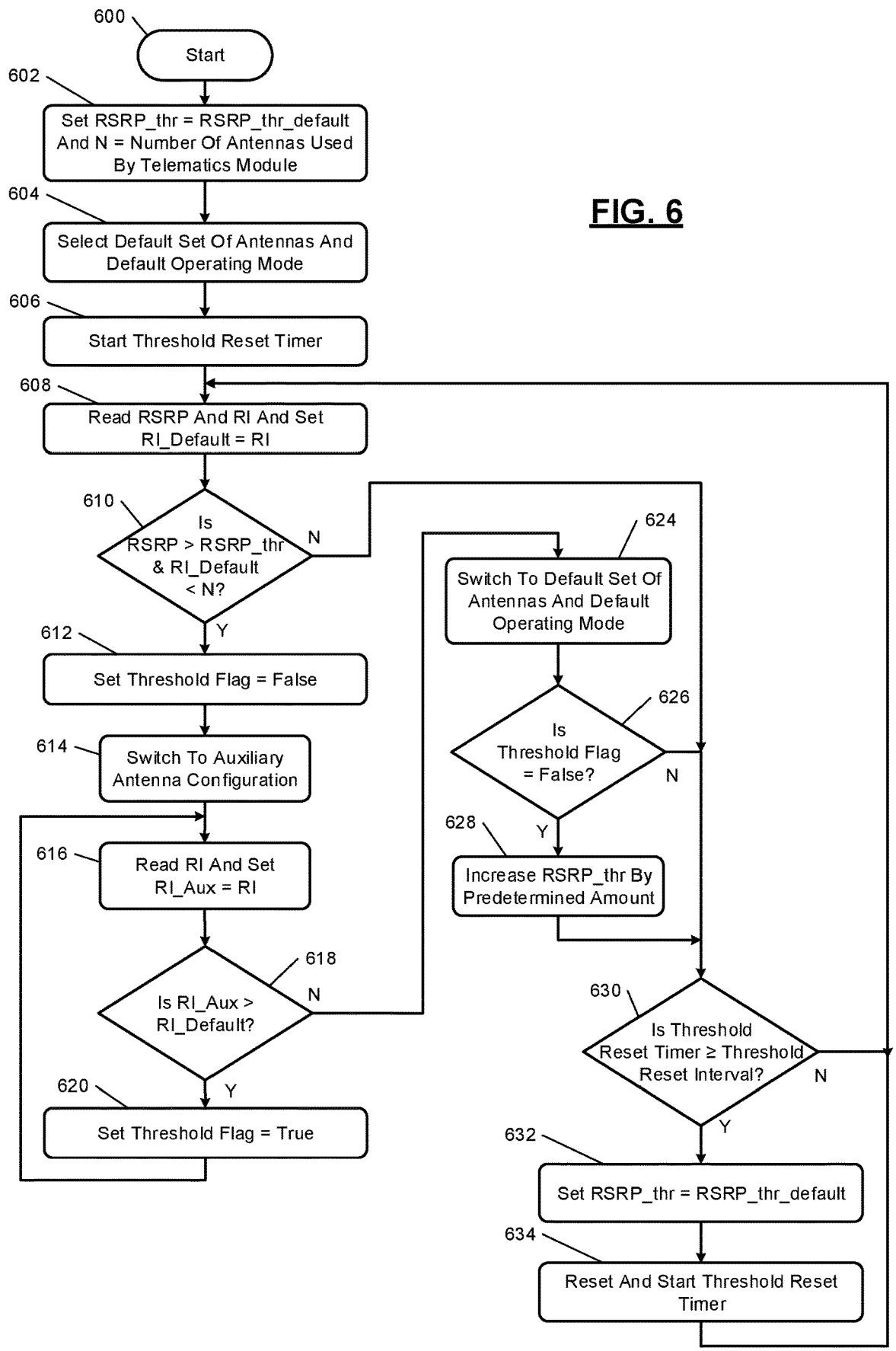
FIG. 6 illustrates another example antenna selection method in accordance with an embodiment of the present disclosure.

The antenna selection module 236 may implement one of the methods of FIGS. 5-6 to determine which of the external antennas 305 and which of the internal antennas 306 to utilize when communicating with network devices external to the vehicle. The antenna selection module 236 may, at any moment in time and based on the channel state information, select one or more of the external antennas and/or one or more of the internal antennas. In one embodiment, this selection is based on the rank value 314 and RSRP value 316. The antenna selection may also be performed based on one or more of the other channel state information parameters referred to herein.

The memory 300 may store additional parameters 320 including, for example, a RI_Default value 322, a reference signal received power threshold (RSRP_thr) value 324, a RSRP_thr_default value 325, a timer value 326, a RI_Aux value 328 and a threshold flag 330. The RI_Default value 322 is rank indicator default value defined as a recorded RI value when using a default antenna configuration. As an example, the RI_Default value 322 may be determined when only two or more of the external antennas 305 are being used. The RSRP_thr value 324 is a RSRP threshold that is set equal to a RSRP_thr_default, which is a RSRP value determined when signal quality is high, for example, while in a high coverage area. The timer value 326 is the value of the threshold reset timer 304. The RI_Aux value 328 is a RI auxiliary value defined as a recorded RI value when using an auxiliary antenna configuration. As an example, the RI_Aux value 328 may be determined when one or more of the internal antennas 306 are being used. The threshold flag 330 may be set to True or False.

Figure 4:
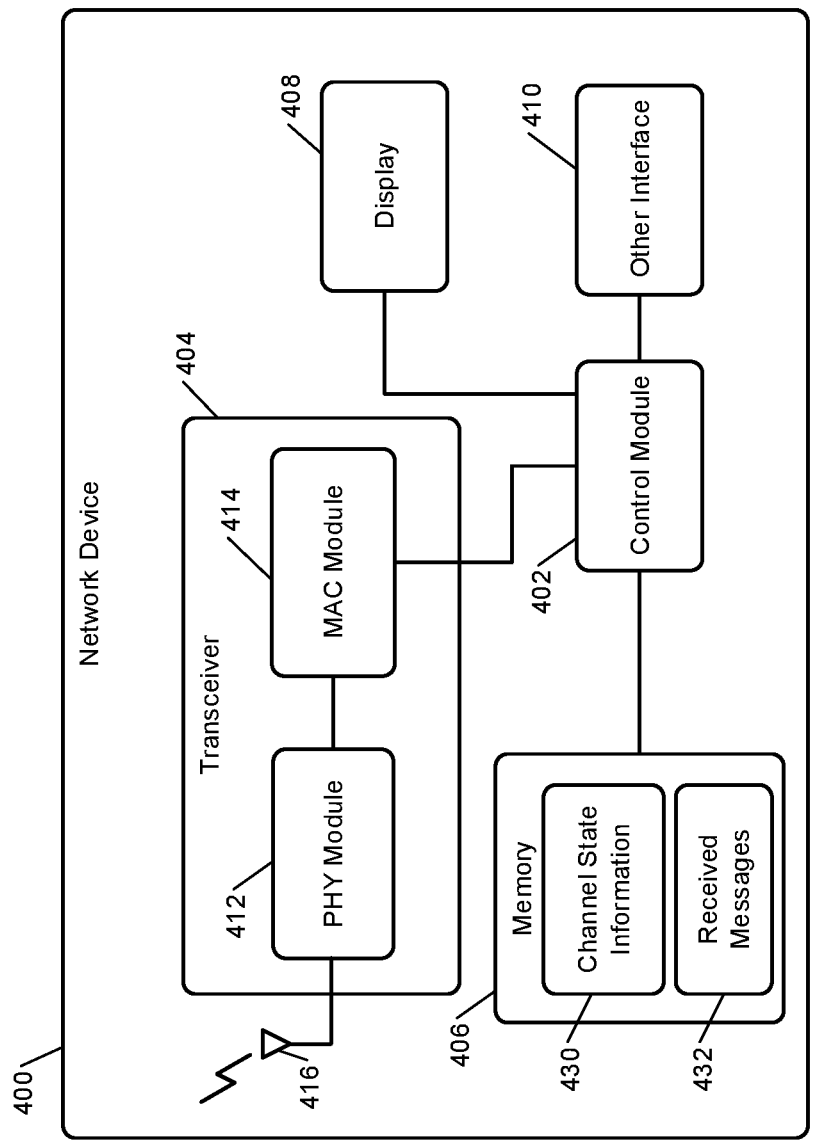
FIG. 4 is a functional block diagram of an example of a network device in accordance with an embodiment of the present disclosure.

FIG. 4 shows a network device 400, such as an access point, a base station (e.g., the base station 118 of FIG. 1), a service provider server (e.g., serer 126 of FIG. 1), or other network devices. The network device 400 may include a control module 402, a transceiver 404, a memory 406, a display 408 and/or another interface 410. The transceiver 404 may include a PHY module 412 and a MAC module 414. The memory 406 may store channel state information and received messages 332.

The systems disclosed herein may be operated using numerous methods, example methods are illustrated in FIGS. 5 and 6. The operating modes of FIGS. 5 and 6 may include the transmit diversity, spatial multiplexing, external antenna mode, internal antenna mode, hybrid antenna mode, and/or other similar antenna operating modes. The initial operating mode prior to or at the beginning of the methods of FIGS. 5 and 6 may be the transmit diversity mode, although the methods may begin when in another mode, such as the spatial multiplexing mode. The telematics control module 204 may operate in one or more of the stated modes, such as in one of the transmit diversity and spatial multiplexing modes and in one of the external, internal, and hybrid modes.

In FIG. 5, an antenna selection method is shown. Although the following operations are primarily described with respect to the implementations of FIGS. 1-4, the operations may be easily modified to apply to other implementations of the present disclosure. The operations may be performed by the antenna selection module 236 and/or be iteratively performed. The operations may be performed after a connection has been established by the connection module 302 with a network device external to the vehicle.

The method may begin at 500. At 502, the antenna selection module 236 sets the RSRP_thr value 324 equal to a RSRP_thr_default value and sets N equal to the minimum number of antennas used at any moment in time by the telematics control module 204 and network device external to the vehicle to communicate with each other including receiving data from and/or transmitting data to a network device external to the vehicle. N is an integer greater than or equal to 2. Operation 502 may be performed subsequent to a signal exchange and/or transfer of data between the network device and the telematics control module 204 that provides the RSRP_thr_default value. At 504, the antenna selection module 236 starts the threshold reset timer 304. The timer 304 may be an incrementing counter (or count up) counter that starts at zero or a decrementing counter that counts down from an initial value.

At 506, the antenna selection module 236 selects a default set of antennas (default antenna combination (or configuration)) and a default antenna operating mode. As an example, this may include operating in an exterior antenna mode, where two or more of the external antennas 305 are selected and used.

At 508, the antenna selection module 236 determines whether the threshold reset timer 304 has expired. If the threshold reset timer 304 has expired, then operation 510 is performed, otherwise operation 514 is performed. The threshold reset timer 304 may expire, for example, when the timer increases to a value that exceeds a predetermined value or decreases to zero.

At 510, the antenna selection module 236 sets the RSRP_thr equal to the RSRP_thr_default value. At 512, the antenna selection module 236 resets and starts the threshold reset timer 304.

At 514, the antenna selection module 236 reads (or looks up/obtains) the latest RSRP and RI values for the current antenna configuration (i.e. the set of antennas currently being used). The latest RSRP and RI values may have been recently determined and/or stored in the memory 300. The RI values may be measured for cellular signaling. The latest RSRP and RI values may be based on and/or associated with transfer of data between the network device and the telematics control module 204. The telematics control module 230 and/or the connection module 302 may continuously determine, update, and/or receive updated channel state information, which is stored in the memory 300. The antenna selection module 236 accesses the memory 300 to obtain the channel state information.

At 516, the antenna selection module 236 determines whether the RSRP value obtained at 514 is greater than the RSRP_thr value and the RI value obtained at 514 is less than N, which is the minimum number of antennas currently used by each of the telematics control module 230 and the network device external to the vehicle. For example, if the telematics control module 230 and the network device external to the vehicle are equipped respectively with two and four antennas, then N is equal to 2. If the RSRP value is greater than the RSRP_thr value and the RI is less than N, then operation 518 is performed, otherwise operation 508 is performed. Operation 518 may be performed when, for example, operating in a rich scattering environment such that the received signal arrives from all directions (e.g., operating in a city). This may be done to increase the number of signal paths associated with using an antenna combination in the current environment to maximize data throughput measured in, for example, mega-bits per second (Mbps). A high (or maximum) RI value may indicate a rich scattering environment, whereas a low (or minimum) RI value may indicate an environment that is not a rich scattering environment. Operation 518 may be performed, when the RI value is low (or a minimum) RI value (e.g., 1). Operation 508 may be performed when the RI value is high (or a maximum) RI value (e.g., 2). Operation 518 may be performed when a channel quality indicator value is high (greater than or equal to a predetermined level) for a high received signal strength level (greater than or equal to a predetermined power level) measured in, for example, decibels milli-watts (dBm). Operation 508 may be performed when the channel quality indicator value is low (less than the predetermined level) for the high received signal strength level. The received signal strength is directly related to the RSRP and is high when RSRP is high.

At 518, the antenna selection module 236 switches among K possible antenna combinations and corresponding operating modes and reads a RI value for each of the K combinations. K is an integer greater than or equal to 1. In one embodiment, values of K, P and Q satisfy equation 1, where P is an integer and is equal to a total number of the external antennas 305 and internal antennas 306, Q is an integer and is equal to a total number of antennas used by telematic control unit.

$$\text{Max}(K) = \frac{P!}{Q!(P-Q)!} \qquad (1)$$

The RI values may be stored and accessed from the memory 300. The K combinations may include one or more combinations of only external antennas, one or more hybrid combinations of one or more external antennas and one or more internal antennas, and/or one or more combinations of only internal antennas.

At 520, the antenna selection module 236 selects one of the K antenna combinations and the corresponding operating mode having a maximum measured RI that is greater than a last previously measured RI of the default antenna combination (or configuration). The selected one of the K antenna combinations may be the default antenna combination or one of the other antenna combinations.

At 522, the antenna selection module 236 determines whether the default antenna combination has been selected. If this is true, then operation 524 is performed, otherwise operation 526 is performed.

At 524, the antenna selection module 236 increases the RSRP_thr by a predetermined amount. At 526, the antenna selection module 236 measures and/or reads a RI value for a current selected set of antennas. At 528, the antenna selection module 236 determines whether the RI value has decreased using the antenna combination selected at 520 (i.e. is less than the last RI value for the last antenna combination used prior to the antenna combination selected at 520). If the RI value has decreased, then operation 506 may be performed, otherwise operation 526 may be performed.

In FIG. 6, an antenna selection method is shown. Although the following operations are primarily described with respect to the implementations of FIGS. 1-4, the operations may be easily modified to apply to other implementations of the present disclosure. The operations may be performed by the antenna selection module 236 and/or be iteratively performed. The operations may be performed after a connection has been established by the connection module 302 with a network device external to the vehicle.

The method may begin at 600. At 602, the antenna selection module 236 sets the RSRP_thr value 324 equal to a RSRP_thr_default value and sets N equal to the minimum number of antennas used at any moment in time by the telematics control module 204 and a network device external to the vehicle with which the telematics control module is communicating. The telematics control module 204 may be using the same number of antennas as the network device at any moment in time for transfer of data between the telematics control module 204 and the network device. Operation 602 may be performed subsequent to a signal exchange and/or transfer of data between the network device and the telematics control module 204 that provides the RSRP_thr_default value.

At 604, the antenna selection module 236 selects a default set of antennas (default antenna combination (or configuration)) and a default antenna operating mode. As an example, this may include operating in an exterior antenna mode, where two or more of the external antennas 305 are selected and used.

At 606, the antenna selection module 236 starts the threshold reset timer 304. The timer 304 may be an incrementing counter (or count up) counter that starts art zero or a decrementing counter that counts down from an initial value.

At 608, the antenna selection module 236 reads the latest RSRP and RI values for the current antenna configuration (i.e. the set of antennas currently being used) and sets the RI_Default value equal to the latest RI value. The latest RSRP and RI values may have been recently determined and/or stored in the memory 300. The RI values may be measured for cellular signaling. The latest RSRP and RI values may be based on and/or associated with transfer of data between the network device and the telematics control module 204. The telematics control module 230 and/or the connection module 302 may continuously or periodically determine, update, and/or receive updated channel state information, which is stored in the memory 300. The antenna selection module 236 accesses the memory 300 to obtain the channel state information.

At 610, the antenna selection module 236 determines whether the RSRP value obtained at 608 is greater than the RSRP_thr and the RI value obtained at 608 is less than N, the minimum number of antennas currently used by the telematics control module 230 and a network device external to the vehicle. If the RSRP value is greater than the RSRP_thr and the RI value is less than N, then operation 612 is performed, otherwise operation 628 is performed. Operation 612 may be performed when, for example, operating in a rich scattering environment such that the received signal arrives from all directions. This may be done to increase the number of signal paths associated with using an antenna combination in the current environment to maximize data throughput. Operation 612 may be performed, when the RI value is low (or a minimum) RI value (e.g., 1). Operation 628 may be performed when switching antenna combination has not increased the RI value. Operation 612 may be performed when a channel quality indicator value is high (greater than or equal to a predetermined level) for a high transmit power level (greater than or equal to a predetermined power level) measured in, for example, decibels milli-watts (dBm). Operation 628 may be performed when the channel quality indicator value is low (less than the predetermined level) for the high received signal strength level. The received signal strength is directly related to the RSRP and is high when the transmit power is high.

At 612, the antenna selection module 236 sets the threshold flag 330 to False. At 614, the antenna selection module 236 switches from the currently being used antenna combination to an auxiliary antenna combination. The auxiliary antenna combination may include one or more of the external antennas 305 and one or more of the internal antennas 306. In one embodiment, the auxiliary antenna combination includes at least one internal antenna. In another embodiment, the auxiliary antenna combination includes at least one external antenna used for both transmitting and receiving data and at least one internal antenna used to receive data. In another embodiment, the auxiliary antenna combination includes only internal antennas. In another embodiment, the antenna selection module 236 selects one of the K antenna combinations and corresponding operating mode having a maximum measured RI that is greater than a last previously measured RI of the default antenna combination (or configuration). In one embodiment, the method of FIG. 6 is performed when there are only two possible antenna configurations namely the default antenna combination and one auxiliary antenna combination (i.e. K=2), where each antenna combination includes N antennas. In another embodiment, two or more auxiliary antenna combinations are available and one of the auxiliary antenna combinations is selected.

The switch performed at 614 is done to improve performance and does not negatively affect performance. The switch performed at 614 may result in no improvement in performance, but does not negatively affect performance. In other words, the data throughput either improves or is maintained at a same level as a result of performing the switch at 614.

At 616, the antenna selection module 236 reads the latest RI value and sets the RI_Aux value 328 equal to the latest RI value. The latest RI value may be associated with transfer of data between the network device and the telematics control module 204.

At 618, the antenna selection module 236 determines whether the RI_Aux value 328 is greater than the RI_Default value 322. If the RI_Aux value 328 is greater than the RI_Default value 322, then operation 620 is performed, otherwise operation 624 is performed.

At 620, the antenna selection module 236 sets the threshold flag equal to True. At 624, the antenna selection module 236 switches to the default set of antennas (or default antenna combination) and default operating mode.

At 626, the antenna selection module 236 determines whether the threshold flag 330 is equal to False. If the threshold flag 330 is equal to False, then operation 626 is performed, otherwise operation 628 is performed.

At 628, the antenna selection module 236 increases the RSRP_thr value 324 by a predetermined amount. This may include incrementing the RSRP_thr value 324.

At 630, the antenna selection module 236 determines whether the threshold reset timer 304 is greater than or equal to a threshold rest interval. The threshold reset interval may be a predetermined period that is stored in the memory 300.

At 632, the antenna selection module 236 sets the RSRP_thr value 324 is set equal to the RSRP_thr_default value 325. At 634, the antenna selection module 236 resets and starts the threshold reset timer 304.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

In the above-described examples the transceiver 232 of FIG. 3 may, at any moment in time, receive with a first predetermined number of antennas and transmit with a second predetermined number of antennas. The first predetermined number of antennas may include one or more of the external antennas 305 and/or one or more of the internal antennas 306. The second predetermined number of antennas may include one or more of the external antennas 305 and/or one or more of the internal antennas 306. The second predetermined number of antennas may be less than the first predetermined number of antennas. In an embodiment, the second predetermined number of antennas does not include an internal antenna.

The above-described examples allow for internal antennas to be selected and used during certain situations. As an example, an internal antenna may be able to better receive data in a rich environment due to the multiple (or increased number of) paths a signal may follow before being received at the internal antenna within a vehicle, whereas there may simply be simply a line-of-sight path for an external antenna. Although power of a signal received via the internal antenna may be lower than the power of the signal received by the external antenna, due to the multiple paths associated with the internal antenna, the data throughput may be increased. In one embodiment, both an external antenna and an internal antenna are used to provide the high gain associated with the external antenna and the improved data throughput associated with using the internal antenna. The above-described examples increase the amount of time a telematics control module is operating in a spatial multiplexing mode and/or similar mode during which multiple different signals are transmitted in parallel from a network device remotely located away from a vehicle and received by the external and/or internal antennas of the vehicle.

The above provided examples include methods to select among K possible antenna combinations and select a best antenna combination based on channel state information to maximize data throughput (e.g., a maximum receive data rate). User perceived data throughput performance is improved. This improves data transmissions associated with autonomous vehicles and over the air telematics control module updates, since data updates are able to be downloaded to vehicles at higher data rates.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A multiple input multiple output communication system for a vehicle, the multiple input multiple output communication system comprising:
a transceiver configured to receive data from a network device remotely located from the vehicle using (i) first antennas disposed external to the vehicle, and (ii) second antennas disposed internal to the vehicle, wherein the transceiver receives the data using a first antenna combination including at least two antennas, and wherein the at least two antennas includes at least one of (i) one or more of the first antennas or (ii) one or more of the second antennas; and
a telematics control module configured to
read channel state information including a first reference signal received power value and a first rank indicator value,
determine if the first reference signal received power value is greater than a threshold value and the first rank indicator value is less than a number of antennas in the at least two antennas being used to receive the data, wherein the number of antennas is a minimum number of antennas used by the telematics control module and the network device remotely located from the vehicle, and
based on the first reference signal received power value being greater than the threshold value and the first rank indicator value being less than the number of antennas, switch from the first antenna combination to a second antenna combination, wherein the second antenna combination includes at least one of the second antennas and is different than the first antenna combination.

2. The multiple input multiple output communication system of claim 1, wherein the first antenna combination includes two or more of the first antennas and does not include any internal antennas.

3. The multiple input multiple output communication system of claim 1, wherein, while using the first antenna combination, at least one of the second antennas is not in use.

4. The multiple input multiple output communication system of claim 1, wherein, while using the second antenna combination, at least one of the first antennas is not in use.

5. The multiple input multiple output communication system of claim 1, wherein, at any moment in time, at least one of (i) one or more of the first antennas, or (ii) one or more of the second antennas is not in use.

6. The multiple input multiple output communication system of claim 1, wherein the second antenna combination includes at least one of the first antennas.

7. The multiple input multiple output communication system of claim 6, wherein the transceiver is configured to transmit using the at least one of the first antennas while using the second antenna combination.

8. The multiple input multiple output communication system of claim 1, wherein:
the telematics control module is configured to select an antenna combination having a best rank indicator value; and
the selected antenna combination having the best rank indicator value is the second antenna combination.

9. The multiple input multiple output communication system of claim 8, wherein a number of possible antenna combinations to select from is greater than two.

10. The multiple input multiple output communication system of claim 1, wherein the telematics control module is configured to:
subsequent to switching to the second antennas combination, read a second rank indicator value;
determine if the second rank indicator value is greater than at least one of the first rank indicator value or a rank indicator default value;
based on the second rank indicator value being greater than the at least one of the first rank indicator value or the rank indicator default value, maintain use of the second antenna combination; and based on the second rank indicator value not being greater than the at least one of the first rank indicator value or the rank indicator default value, return to using the first antenna combination.

11. The multiple input multiple output communication system of claim 10, wherein the telematics control module is configured to:
based on the second rank indicator value not being greater than the at least one of the first rank indicator value or the rank indicator default value, increase the threshold value;
read a second reference signal received power value and a third rank indicator value;
determine if the second reference signal received power value is greater than the increased threshold value and the third rank indicator value is less than the number of antennas; and
based on the second reference signal received power value being greater than the increased threshold value and the third rank indicator value being less than the number of antennas, switch to the second antenna combination or a third antenna combination, wherein the third antenna combination includes at least one of the second antennas.

12. The multiple input multiple output communication system of claim 1, wherein the telematics control module is configured to set the threshold value equal to a default value when the vehicle is in a high coverage area and signal quality is greater than a predetermined level.

13. The multiple input multiple output communication system of claim 12, wherein the telematics control module is configured to:
starting a threshold reset timer prior to switching to the second antenna combination;
switching from the second antenna combination back to the first antenna combination;
increasing the threshold value as a result of switching back to the first antenna combination;
determining if threshold reset timer has expired; and
based on the threshold reset timer expiring, resetting the threshold value to the default value.

14. The multiple input multiple output communication system of claim 1, further comprising the first antennas and the second antennas.

15. An antenna selection method for a telematics control module of a multiple input multiple output communication system, the antenna selection method comprising:
receiving data from a network device remotely located from a vehicle using a first combination of antennas, wherein the first combination of antennas includes at least two antennas, wherein the at least two antennas includes at least one of (i) one or more first antennas or (ii) one or more second antennas, wherein the first antennas are disposed external to the vehicle, and wherein the second antennas are disposed internal to the vehicle;
via the telematics control module, reading channel state information including a first reference signal received power value and a first rank indicator value;
determining if the first reference signal received power value is greater than a threshold value and the first rank indicator value is less than a number of antennas in the at least two antennas being used to receive the data, wherein the number of antennas is a minimum number of antennas used by the telematics control module and the network device remotely located from the vehicle; and
based on the first reference signal received power value being greater than the threshold value and the first rank indicator value is less than the number of antennas, switching from the first antenna combination to a second antenna combination, wherein the second antenna combination includes at least one of the second antennas and is different than the first antenna combination.

16. The method of claim 15, further comprising setting the threshold value equal to a default value when the vehicle is in a high coverage area and signal quality is greater than a predetermined level.

17. The method of claim 15, wherein:
while using the first antenna combination, at least one of the second antennas is not in use;
while using the second antenna combination, at least one of the first antennas is not in use; and
at any moment in time, at least one of (i) one or more of the first antennas, or (ii) one or more of the second antennas is not in use.

18. The method of claim 15, further comprising selecting an antenna combination having a best rank indicator value, wherein:
the selected antenna combinations having the best rank indicator value is the second antenna combination; and
a number of possible antenna combinations to select from is greater than two.

19. The method of claim 15, further comprising:
subsequent to switching to the second antennas combination, reading a second rank indicator value;
determining if the second rank indicator value is greater than at least one of the first rank indicator value or a rank indicator default value;
based on the second rank indicator value being greater than the at least one of the first rank indicator value or the rank indicator default value, maintaining use of the second antenna combination; and
based on the second rank indicator value not being greater than the at least one of the first rank indicator value or the rank indicator default value, returning to using the first antenna combination.

20. The method of claim 19, further comprising:
based on the second rank indicator value not being greater than the at least one of the first rank indicator value or the rank indicator default value, increasing the threshold value;
reading a second reference signal received power value and a third rank indicator value;
determining if the second reference signal received power value is greater than the increased threshold value and the third rank indicator value is less than the number of antennas; and
based on the second reference signal received power value being greater than the increased threshold value and the third rank indicator value being less than the number of antennas, switching to the second antenna combination or a third antenna combination, wherein the third antenna combination includes at least one of the second antennas.

* * * * *